April 21, 1964   D. LEE FAVRE   3,129,566
LOW TEMPERATURE HEAT ENGINE AND AIR CONDITIONER
Filed Aug. 17, 1959
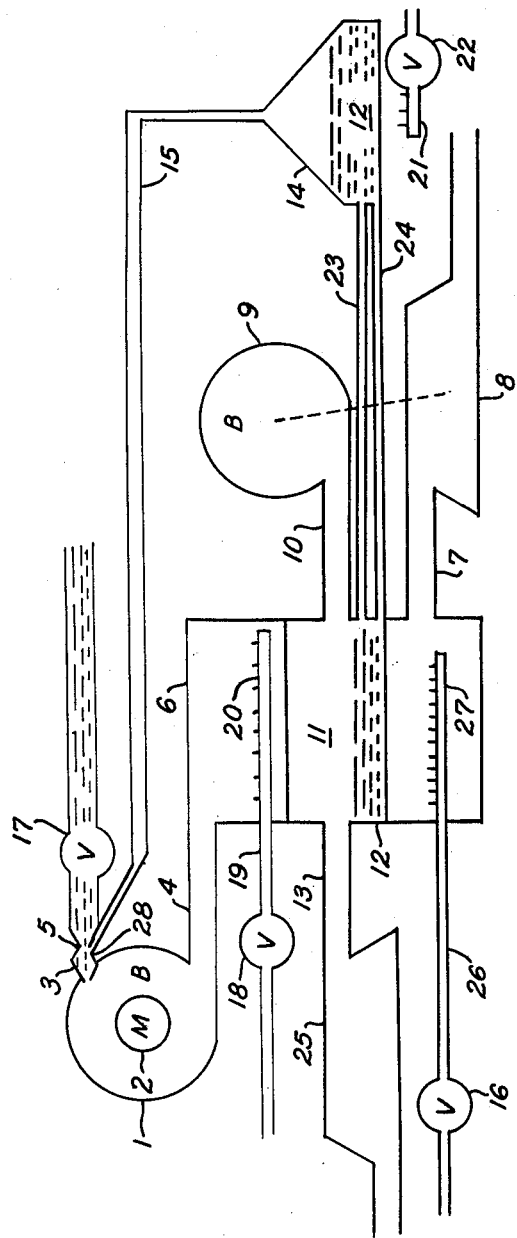
INVENTOR
Donavon Lee Favre United States Patent Office 3,129,566
Patented Apr. 21, 1964

3,129,566
LOW TEMPERATURE HEAT ENGINE AND AIR CONDITIONER
Donavon Lee Favre, Washington, D.C.
(7403 Arcadia Road, Parklawn Area, Alexandria 12, Va.)
Filed Aug. 17, 1959, Ser. No. 834,271
4 Claims. (Cl. 62—88)

My invention can be briefly described as a method for utilizing the heat energy contained in atmospheric air and/or other heat energy to do useful work. Liquid vaporization is used as the heat well. My invention also incorporates a chemical physical method for removing undesirable gases from the air.

In the past, air conditioning units have consisted of basically two types. One type has been the conventional refrigeration type whereby a gas is compressed, the heat is removed from the compressed gas and wasted, and the gas condenses at the lower temperature. The condensed gas is then allowed to evaporate at a reduced pressure, causing cooling. A second type of air conditioner for use in dry climates consists of the conventional water evaporator, blower combination. Air is drawn through a fibrous or porous water saturated material and blown into a building, the air having been cooled by the water evaporated into the air. The evaporator type air conditioner is unsuitable for damp climates as it causes an uncomfortable humidity. The type of air conditioner which I propose converts the heat content of the air into mechanical energy and does not increase the water content of the conditioned air.

My invention is also capable of being used as a heat engine, a humidifier, a heater, or a selective gas absorber among other things.

A brief description of the drawing is as follows: the figure shows arrangement whereby air is blown, humidified, absorbs the heat from air to be cooled and then used to drive a turbine. The airstream to be cooled is blown, cooled by heat exchange, dehumidified by a chemical, physical dehumidification system, then used to drive a turbine.

A detailed description of my invention is as follows: Two separate currents of air pass through the apparatus as shown in the figure. In order to avoid confusion the airstreams will be called airstream one and airstream two. Airstream one enters the blower 1 driven by a motor 2. Water enters the blower 2 through the solid stream nozzle 3. The impact of the water on the blades of the blower assists in driving the blower. Airstream one passes through a duct 4. Airstream one then passes through the heat exchanger 6 at a high velocity and low pressure. Upon leaving the heat exchanger through the duct 7, the energy present in airstream one as velocity is utilized to drive a turbine 8. Airstream one is discharged as waste upon leaving the turbine 8.

Airstream two consists of the air to be conditioned. Airstream two is blown by blower 9 through duct 10 into a sealed chamber 11 of heat exchanger 6. In compartment 11 the velocity of airstream two is decreased. The heat contained in airstream two is transferred into airstream one, thus cooling airstream two. In addition, moisture and carbon dioxide in airstream two are absorbed in the sodium hydroxide solution 12. Airstream two passes through duct 13 and drives turbine 25. Airstream two then enters the structure to be cooled or conditioned. In order that the sodium hydroxide solution 12 does not become saturated with water and carbon dioxide, the water and carbon dioxide are pulled off by a vacuum. Solution 12 passes through pipe 23 to the chamber 14. The chamber 14 is a sealed compartment. A duct 15 is attached to chamber 14 above the sodium hydroxide level.

Duct 15 is attached to aspirator 5 at a low pressure point. The vacuum created in chamber 14 causes evaporation of the water and a release of the carbon dioxide contained in the sodium hydroxide solution. The dehydrated, degassed sodium hydroxide solution returns to chamber 11 through pipe 24. A heater 21 is placed below chamber 14 to assist in removing the water and carbon dioxide from the sodium hydroxide solution. Heater 21 is used when humidity control is more important than temperature control. Heater 21 is controlled by valve 22.

If airstream one is heated after it passes through the heat exchanger, more power can be developed by turbine 8.

Airstream one is heated by opening valve 16, allowing gas to flow through pipe 26 into a burner 27.

If it is desired to use the entire unit for heating purposes, valve 17 is closed. Valve 18 is opened allowing gas to flow through pipe 19 into burner 20. Burner 20 is placed in airstream one prior to the point where airstream one exchanges heat with airstream two. The valves and motor current can be thermostatically controlled. The energy output of turbine 8 can be used to drive blower 9, and or assist in the driving of blower 1.

Explanation of the theory of operation of the figure is: Blower 1 is a motor driven ten horsepower blower capable of handling 500 to 625 cubic feet per minute of air volume at a velocity head equivalent to a pressure head of two pounds per square inch. Nozzle 3 is attached to a water line having a pressure of 40 to 100 pounds per square inch. Nozzle 3 produces a solid high velocity stream of water one-eighth inch in diameter. This stream is directed against the blades of blower 1 in the direction of rotation.

Suppose one pound mole of dry air enters the blower at 90° F. and 0.15 pound mole of water are evaporated into the dry air. The air will be cooled according to the equation $$\frac{\text{pound moles of water evaporated} \times \text{heat of vaporation}}{\text{Heat capacity of air}}$$

$$= 31.5° \text{ F.}$$

The volume of air entering the blower is represented by $$V = \frac{NRT}{P}$$

or 400 cubic feet. The volume of wet air leaving the blower 1 is 364 cubic feet assuming that 0.015 pound mole of water vapor have been added, that the gas has been cooled 31.5° F. and that the blower 1 has increased the velocity head of the blown air and not the pressure of the blown air. It will also be noted at this point that the energy required to blow the air is decreased because the air was being cooled as it was being blown; i.e., the work required to increase the velocity of the air was less than is required for isothermal compression. Assuming that the heat exchanger is 100% efficient, the cool humid mist laden air will be rewarmed to 90° F. In warming, an additional 0.035 pound mole of water vapor will enter the air because of vaporization of the water mist. 420 cubic feet of humid air will be available to drive the turbine 8. 840 B.t.u.'s will be removed from the air to be conditioned by every pound mole of dry air entering the blower 1.

The air to be conditioned passes through a separate compartment 11 of the heat exchanger 6. The conditioned air compartment 11 contains a 70% sodium hydroxide solution. As air passes through this compartment water vapor and carbon dioxide are absorbed into the sodium hydroxide solution. A pipe 23 is attached to the sodium hydroxide compartment below the level of the sodium hydroxide. The pipe 23 provides a passageway for the sodium hydroxide solution to enter a sealed container 14. A second pipe 24 is attached to the container 14 above the sodium hydroxide solution. The opposite end of the second pipe is attached to vacuum connection 28 of the aspirator 5. The aspirator is powered by the above described water flowing into the blower 1. The vacuum created in the sodium hydroxide container removes water and carbon dioxide from the sodium hydroxide solution. The sodium hydroxide solution is then recycled back into the sodium hydroxide compartment 11 of the heat exchanger 6, by gravity flow. A vacuum pump can be used in lieu of the aspirator. A small burner may also be placed below the sodium hydroxide container to assist in driving off the dissolved gases and water vapor.

If the unit shown in the figure is to be used as a heater it will function essentially like a typical jet engine having a heat exchanger in the combustion chamber. A blower 1 will blow cold air into the combustion chamber. Combustion will occur heating the air and changing the air and fuel to combustion products. Heat will be removed in the heat exchanger 6. Heat left in the combustion gases due to the inefficiency of the heat exchanger will be utilized to drive the exhaust turbine 8. The air to be heated will be blown through the conditioned air compartment 11 into the structure to be heated. The exhaust turbine 8 can be used to assist in driving the blower 1.

The stream of air being conditioned may also be circulated by a blower alone. The stream of air being conditioned may also be circulated by withdrawing airstream one from the structure to be air conditioned and discharging airstream one outside of the structure to be air conditioned. The vacuum created will cause airstream two to flow through the heat exchanger.

Although I have described my invention with a certain degree of particularity, it is understood that the present disclosure has been made only by way of example and that numerous changes in the details of construction and the combination and arrangement of parts may be resorted to without departing from the spirit and scope of the invention.

I claim:

1. A method of conditioning the air in a space which comprises increasing the velocity of an airstream, adding water to the airstream, passing the airstream through a heat exchanger, using the airstream to drive a turbine, blowing a second airstream through the heat exchanger, transferring heat from the second airstream into the first airstream, absorbing the undesirable gases in the second airstream into a sodium hydroxide solution, circulating the sodium hydroxide solution through a second compartment, providing a vacuum in the second compartment to desorb the undesirable gases in the sodium hydroxide solution, driving a turbine with the second airstream, and allowing the second airstream to enter the space to be conditioned.

2. A method of conditioning the air in a space which comprises increasing the velocity of an airstream, vaporizing water into the airstream, passing the airstream through a heat exchanger using the airstream to drive a turbine, blowing a second airstream through the heat exchanger, transferring heat from the second airstream into the first airstream, removing moisture from the second airstream allowing the second airstream to enter the space to be conditioned.

3. A method of conditioning the air in a space which comprises increasing the velocity of an airstream, vaporizing water into the airstream, passing the airstream through a heat exchanger, using the airstream to drive a turbine, compressing a second air stream upstream of the heat exchanger, transferring the heat in the second airstream into the first airstream, removing the condensed moisture from the second airstream, driving a turbine with the second airstream, allowing the second airstream to enter the space to be conditioned.

4. A method of conditioning the air in a space which comprises increasing the velocity of an airstream, adding water to the airstream, passing the airstream through a heat exchanger, heating the airstream with a heating element, using the airstream to drive a turbine, blowing a second airstream through the heat exchanger, transferring heat from the second airstream into the first airstream, absorbing the undesirable gases in the second airstream into a sodium hydroxide solution, circulating the sodium hydroxide solution through a second compartment, providing a vacuum in the second compartment to desorb the undesirable gases in the sodium hydroxide solution, driving a turbine with the second airstream, and allowing the second airstream to enter the space to be conditioned.

References Cited in the file of this patent

UNITED STATES PATENTS

| | | |
|---|---|---|
| 219,085 | Fryer | Sept. 2, 1879 |
| 1,167,158 | Emmet | Jan. 4, 1916 |
| 1,400,813 | Graemiger | Dec. 20, 1921 |
| 1,993,585 | Bauman | Mar. 5, 1935 |
| 2,069,269 | Perkins | Feb. 2, 1937 |
| 2,086,781 | Rosencrants | July 13, 1937 |
| 2,175,162 | Waterfill | Oct. 3, 1939 |
| 2,175,163 | Waterfill | Oct. 3, 1939 |
| 2,272,925 | Smith | Feb. 10, 1942 |
| 2,304,151 | Crawford | Dec. 8, 1942 |
| 2,390,104 | Kaufman | Dec. 4, 1945 |
| 2,399,394 | Seippel | Apr. 30, 1946 |
| 2,468,293 | Du Pre | Apr. 26, 1949 |
| 2,477,831 | King | Aug. 2, 1949 |
| 2,718,115 | Adamek | Sept. 20, 1955 |
| 2,730,874 | Schelp | Jan. 17, 1956 |
| 2,747,382 | Sloan | May 29, 1956 |
| 2,784,571 | Schelp | Mar. 12, 1957 |
| 2,786,626 | Redcay | Mar. 26, 1957 |
| 2,820,348 | Sauter | Jan. 21, 1958 |
| 2,834,188 | Bradford | May 13, 1958 |
| 2,852,090 | Kelly | Sept. 16, 1958 |
| 2,881,853 | Kelly | Apr. 14, 1959 |